United States Patent [19]

Rodney

[11] Patent Number: 4,528,547
[45] Date of Patent: Jul. 9, 1985

[54] DRIVING HABIT MONITOR AND SENSOR THEREFOR

[76] Inventor: Peter W. Rodney, 66 Elmcrest Rd., Etobicoke, Ontario, Canada, M9C 3R9

[21] Appl. No.: 507,072

[22] Filed: Jun. 28, 1983

[30] Foreign Application Priority Data

Jun. 2, 1983 [CA] Canada .................................. 429488

[51] Int. Cl.³ .............................................. B60Q 1/00
[52] U.S. Cl. .................................. 340/52 R; 180/282; 340/52 F; 340/62
[58] Field of Search ................. 340/679, 62, 69, 52 F, 340/66, 71, 52 H; 180/282, 283; 200/61.5, 61.51, 61.47; 368/8; 235/91 D, 91 H; 280/6 H, DIG. 1; 33/366, 365, 379

[56] References Cited

U.S. PATENT DOCUMENTS

| | | | |
|---|---|---|---|
| 2,692,652 | 10/1954 | Wilson | 180/282 X |
| 2,917,126 | 12/1959 | Phillips | 180/282 X |
| 3,703,617 | 11/1972 | Burnett | 200/61.5 |
| 3,778,763 | 12/1973 | Johns et al. | 200/61.47 X |
| 3,798,593 | 3/1974 | Sartor | 340/62 X |
| 3,967,135 | 6/1976 | Balban | 340/52 H X |
| 4,275,378 | 6/1981 | Henderson | 340/71 |
| 4,349,809 | 9/1982 | Tomes | 340/52 H |

Primary Examiner—James L. Rowland
Assistant Examiner—Chi K. Lau
Attorney, Agent, or Firm—Donald E. Hewson

[57] ABSTRACT

The disclosure goes beyond prior art that shows G-level sensors which merely actuate warning bells, etc., in that the display is of the number of excesses of G-level per unit time. According to the invention, the rate at which a person exceeds a pre-set limit of G-level is a measure of the violence of his driving. Besides this novel form of display or presentation, a novel G-level sensor is disclosed. The sensor comprises a short length of polyethylene tubing, sealed with polyethylene plugs and containing a blob of mercury. The tube is bent over a saddle to provide a central curved portion and two straight arms. Wires are pushed through the walls of the tube near the ends of the arms, to act as electrical contacts. The disposition of the sensor is such as to virtually ensure freedom from spurious signals due to sloshing of the mercury, by using the mercury's own surface tension.

20 Claims, 3 Drawing Figures

DRIVING HABIT MONITOR AND SENSOR THEREFOR

FIELD OF THE INVENTION

This invention relates to a driving habit monitor for vehicles, comprising an indicator for fitment to a vehicle to show with what degree of violence the vehicle is being driven.

It is already known to provide a sensor on a vehicle, the purpose of which is to indicate when the vehicle is being subjected to forces in excess of a predetermined value. The forces of concern are those of acceleration, braking, and cornering. The magnitude of such forces is conveniently expressed in terms of G-level. (The G-level is the ratio of the magnitude of the force to the weight of the vehicle).

PRIOR ART

U.S. Pat. No. 2,917,126 (PHILLIPS, Dec. 15, 1959) shows a device that senses when an agricultural tractor is on the point of tipping too far for safety. Two sensors are shown; one produces a signal when the vehicle tips too far front-to-back, and the other when it tips too far side-to-side. The front-to-back signal is used to disconnect the tractor's clutch, while the side-to-side signal is used to actuate the brake on one side of the tractor and thus cause the tractor to steer into the direction of imminent tipping. The G-level sensor's construction is based on the use of a mercury-level switch. Baffles are suggested to damp out spurious movements of the mercury and to prevent unwanted signals.

In U.S. Pat. No. 2,692,652 (WILSON, Oct. 26, 1954) a two-stage G-level sensor is shown. First, the sensor provides a visual signal to alert the driver, and then, in case that warning is not heeded, the sensor provides another signal that stops the vehicle's engine. The G-level sensor's construction is again based on a mercury-level switch, and again baffles are suggested to prevent splashing of the mercury.

In U.S. Pat. No. 3,703,617 (BURNETT, Nov. 21, 1972) a G-level sensor acts to disconnect the vehicle's battery upon impact. The sensor's construction is based on the provision of an unstable strut that collapses by a pendulum action.

In U.S. Pat. No. 3,798,593 (SARTOR, Mar. 19, 1974) a G-level sensor provides a variable signal that makes a lamp glow the more brightly the higher the G-level. Also, the sensor triggers a buzzer alarm when the G-level exceeds a predetermined value. The sensor is based on the movement of a pendulum which progressively changes an electrical resistance.

In U.S. Pat. No. 3,967,135 (BALBAN, June 29, 1976) a G-level sensor is used to actuate a vehicle occupant-restraint system upon impact. The G-level sensor is based on using the movement of an inertial mass to interrupt a light beam.

Some of the sensors have had the facility to produce a proportional or analog signal that varies with the strength of the G-level forces. Others have been only able to provide a simple on/off signal at some pre-determined value of the G-level. The latter can be much more rugged, reliable and inexpensive than the former. Some of the sensors have been very sensitive, and able to resolve small differences in G-level. Others have been so crude as to be capable of indicating only gross changes, such as those that may occur on impact.

BRIEF DESCRIPTION OF THE INVENTION

It is recognized in the invention that a simple G-level sensor can be used effectively to measure the driving habits of a person. The prior art has contemplated just the idea of indicating when an excessive G-level had occurred, for the various purposes as set out. In a first aspect of the invention, the excessive G-level occurrences are related to elapsed time. The invention includes a counter that counts the number of occasions that a pre-determined G-level is exceeded. The invention includes also a timer by which the number of excesses that occur in a given time can be counted. Instead of separate counter and timer, a combined EPUT (events per unit time) indicator may be provided.

The invention provides a monitor that shows G-level excesses per unit time. Such an indicator is useful when displayed to the driver, to give the driver some information feedback whereby he may observe and improve his driving habits. Alternatively, the monitor may be installed secretly (one in each of a fleet of vehicles, for example) for later perusal by an inspector.

According to the invention, the number of times a given G-level is exceeded per unit time is a measure of the violence with which the vehicle is being driven, at least so far as concerns the wear and tear on the vehicle. Within limits, therefore, it does not matter much what actual G-level is sensed, so long as it remains constant: it is the rate at which a person exceeds the pre-determined level that indicates the violence of his driving.

If the excess level is set too high, then the accuracy of the monitor will suffer, since then only real emergencies (swerving, braking, to avoid obstacles) will be indicated. Although such emergencies happen more often to the more violent drivers, even careful and moderate drivers do experience them, without that experience being any indication of their driving habits. The sensor level should be set so that the number of excesses due to the normal movements of the car by an ordinary driver quite swamps the number of excesses due to the real emergencies.

On the other hand, the level could be set too low, so that the sensor would be actuated upon the slightest force acting on the car: now, the number of excesses indicates just the fact that the vehicle is moving, not that it is being driven violently.

The sensor used in the invention need only be a simple on/off device. There is no need for a sophisticated analog or proportional signal. The counter and timer also have simple functions. In summary, the driving habit monitor of the invention can be simple in its design, inexpensive to manufacture, durable in construction, and reliable in use.

The sensor does need to be of the sensitive kind; the crude impact-sensors are not sensitive enough. Also, the sensor must be of the kind that is always ready for use; the kind of sensor that needs to be re-set after it has produced its signal is quite unsuitable. The sensor should be of the kind that maintains its setting precisely and accurately, once set. The sensor should also be not prone to "bounce": when the vehicle is subjected to a G-level that is very close to the set level, an unsuitable sensor may slightly overshoot, then undershoot, producing a whole string of signals when only one signal was justified by the manner of driving.

The monitor of the invention may be built into the vehicle during manufacture, or it may be fitted to the vehicle afterwards. In the latter case, it is important that the monitor be simple to connect up to the vehicle, and also that it should be easy to calibrate and set the required excess G-level at which the signals will be counted. In the former case, it may be important that the settings are not adjustable, so that continuity vehicle-to-vehicle of the settings may be easily achieved.

In recognition of all these special requirements, the invention provides also a sensor, which is constructed and arranged so as to match the requirements in an inexpensive manner. This aspect of the invention will become clear from the following description of a preferred embodiment of the invention, which will now be described with reference to the accompanying drawings.

IN THE DRAWINGS

Figure 1:
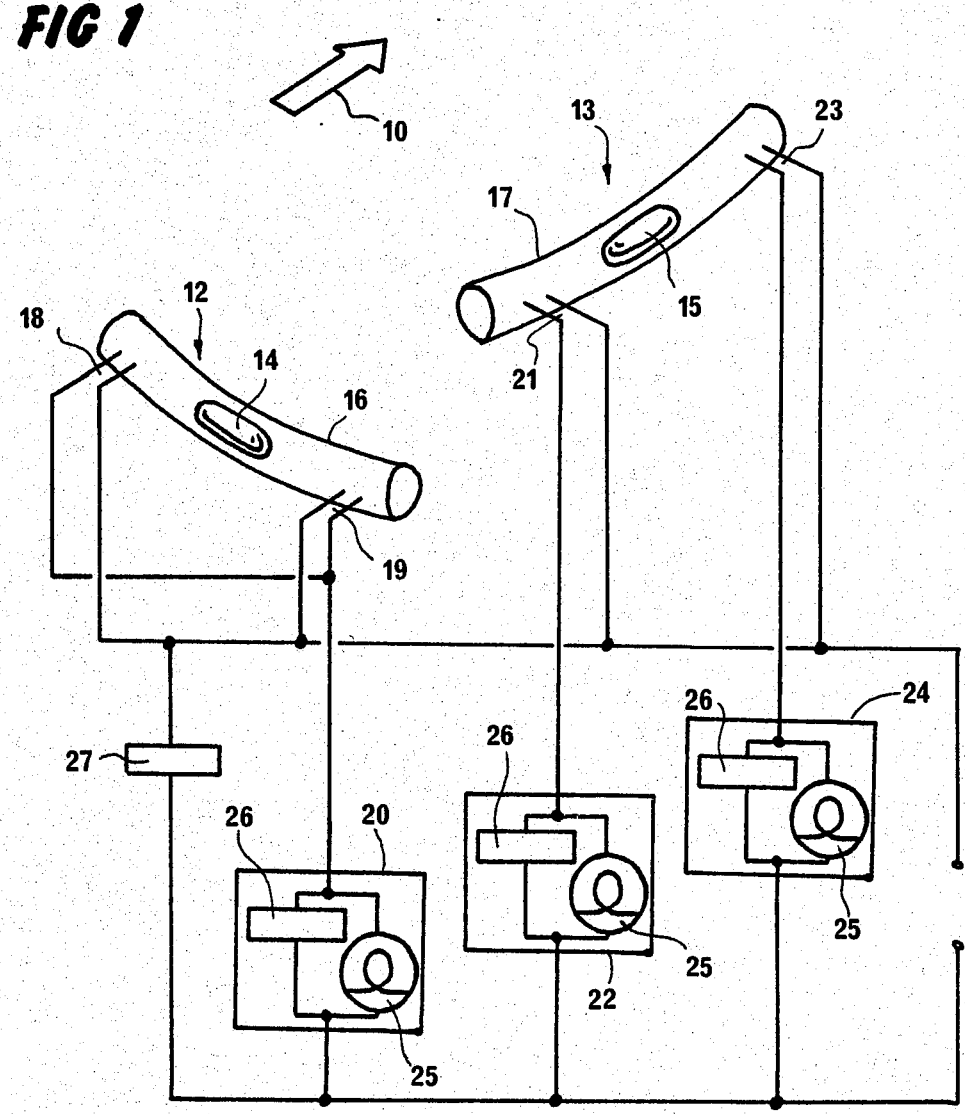
FIG. 1 is a diagrammatic view and circuit layout of a driving habit monitor.
Figure 2:
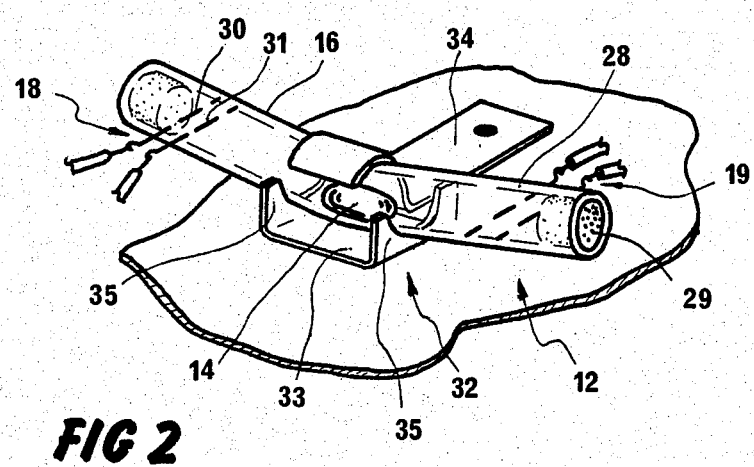
FIG. 2 is a pictorial view of a sensor of the monitor of FIG. 1.
Figure 3:
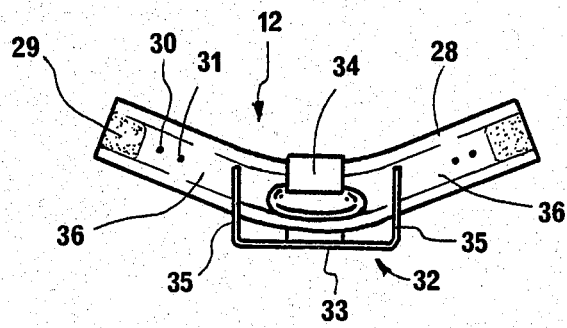
FIG. 3 is a side elevation of the sensor of FIG. 2.

The driving habit monitor includes two G-level sensors 12, 13. One sensor 12 is disposed across the vehicle, and the other 13 is disposed longitudinally; i.e., parallel to the direction of motion 10. Each sensor 12, 13 comprises a blob of mercury 14, 15 enclosed in a sealed tube 16, 17.

When the vehicle is cornering, the blob 14 moves to the left or to the right in the tube 16, and if the vehicle is cornering violently enough then the blob 14 will encounter the appropriate one of the pairs 18, 19 of electrical contacts. If so, an electrical circuit is made, which causes an indicator 20 to indicate the fact.

When the vehicle is over-accelerating, the blob 15 similarly encounters the pair 21 of contacts, to activate the indicator 22. Again, when the vehicle is over-braking, the blob 15 encounters the pair 23 of contacts, and activates the indicator 24.

The indicators 20, 22, 24 may take different forms. They may each be just a warning lamp 25; or, they may each be a counter 26; or, they may each be both a counter and a warning lamp.

An elapsed time indicator 27 is provided, which is connected so as to record the time the vehicle is in operation, i.e., when the ignition switch is on.

In the first aspect of the invention, the combination of indicators is such that the number of activations of the G-level sensors may be compared with the elapsed time of operation of the vehicle. These rates may be derived from a combination of readings, or may be indicated directly. Depending on whether the monitor is to be on view to the driver, or is to be kept secret from the driver, the counters 26, and the time indicator 27 may be easily re-settable to zero, or their settings may be locked in.

The second aspect of the invention is concerned particularly with the construction of the sensors 12, 13.

The sensor 12 (and the sensor 13 is identical) comprises a length of polyethylene tubing 28. The tube 28 is sealed at each end with a respective plug 29. The plug 29 is also of polyethylene; a material that has the property that after some time the plugs 29 become one with the tube 28. Rather than polyethylene, other suitable plastic material such as vinyl may be used.

The pair 18 of contacts comprise two wires 30, 31, each made of stainless steel, of about 0.02 inches diameter. Each wire is simply pushed through the tube 28. The material of the tube is such that sealing of the wire to the tube happens without any other steps having to be taken: when an electrical lead is soldered onto the wire the heat conducted along the wire locally fuses the polypropylene, which completes the seal.

The tube 28 is held in place by means of a clamp 32. The clamp 32 has two components, a saddle 33 and a strap 34. The saddle 33 has two supports 35, equi-spaced either side of the strap 34.

The dimensions of the various components of the sensor 12 are important to its performance, and the significant ones will now be described. The tube 28 is 2.5 inches long, the plugs 29 each being 0.25 inches long so that the length inside the tube, for the mercury blob 14 to move in, is 2.0 inches.

The two supports 35 of the saddle 33 are 0.75 inches apart. The tube 28 has a bore of 0.25 inches diamater, and a wall thickness of 0.06 inches, and the tube 28 is therefore of a consistency that it bends when it is tightened down onto the supports 35 by the strap 34. The strap 34 is tightened until the arms 36 of the tube (that is, the un-bent portions of the tube 28 that lie outside the supports 35) assume an angle substantially of 20 degrees to the horizontal.

To be successful as a G-level sensor for a driving habit monitor, a sensor has to be quick to respond to a sudden excess of G-level, and quick to settle back when the G-level drops. It is important though that this requirement for quick response is not achieved at the expense of a sensor that overshoots, or gives other kinds of false results: ideally, the mercury blob should move smoothly but rapidly to the appropriate position, and yet should stay firmly in the new position without sloshing back and forth.

It would be very expensive to provide a mercury sensor that had those characteristics if the sensor had to produce different signals at different G-levels. In the invention, however, only a simple on/off signal is required. It is recognized that the extremely simple construction of sensor that is described herein has the characteristic that the mercury does not tend to remain just-in or just-out of contact with the pairs of contacts. Over the curved centre portion of the tube 28, the mercury moves gradually and proportionately as the G-level alters, but over the straight arms 36, the mercury moves suddenly and completely: either the mercury is substantially not in the arm 36, or it is all the way up the arm 36. Similarly, as the G-level falls, the mercury suddenly falls back down to the curved portion of the tube 28. If there were no straight arms 36 (that is, if the supports 35 were so far apart that the tube 28 was curved right up to the contacts 18) then this sudden change in position of the mercury 14 would not occur, and the mercury might then hover on the point of bridging the wires 30, 31, which would give false readings.

The manner of bending the tube 28 is therefore important in making the mercury move in the desired fashion. Not only is that important, but also the location of the wires 30, 31 is important in fully exploiting the properties of the mercury. The wire 30 is placed 0.125 inches in from the plug 29, and the wire 31 a further 0.125 inches in from the wire 30.

Mercury is a substance with a very high surface tension, at least when it is in contact with such materials as polyethylene and stainless steel. The dimensions referred to enable this property to be used with advantage, in the invention. When it is at the end of an arm 36, the blob 14 is held at the end by its surface tension and adhesion with the plug 29, and with the two wires 30, 31. If the wire 30 were closer to the plug 29 then the surface tension against it would be lost in the surface tension due to the plug: the wires 30, 31 can each make a contribution to holding the blob 14 at the end of the tube 28, when they are arranged one after the other, and with the particular spacing.

It is important also that the mercury blob 14 should not close over the wires 30, 31 when the blob is at the end of the tube 28, since that might tend to fragmentise the blob 14. The wires pass horizontally half-way up the tube for this reason. A blob that occupies a tube length of about 0.5 inches has been found to behave in the desired manner, as described, when the sensor is used in a driving habit monitor.

It will be noted that though the sensor as described has the desired properties of responsiveness and sensitivity, and has hardly any tendency to produce spurious signals, nevertheless the sensor is extremely simple to make, with the use only of inexpensive material (apart from the mercury itself) and without the need for special tools nor of precision manufacture and assembly.

The angle of the arms 36 has been mentioned as being 20 degrees which corresponds to a G-level of about 36%. This value might be different for braking as compared with cornering, for example, but it has been found that the most useful information is provided when the four arms (i.e., the two arms of both sensors) are all set at this same value. It can be arranged that the strap 35 bottoms against the saddle 33 when this angle is reached during manufacturing assembly, to avoid the need for a setting-up measurement. It may also be arranged that the blob of mercury act as spirit levels in their tubes (the tubes being transparent in this case) to aid the mounting of the monitor in the vehicle.

Although the sensor as described has little tendency to produce spurious signals, still further freedom from the effects of bouncing or sloshing of the mercury can be achieved by the provision of a delay in the electrical circuit. It could be arranged for example that an indicator 20, 22, 24 once it had responded to a signal from the contacts 18, 19, 21, 23 would not respond to another signal from the same source for a period of, say, two seconds. If the signal were still present after that time, then another excess of G-level would be indicated, which indication would be justified under the circumstances.

What is claimed is:

1. Sensor for a driving habit monitor for a vehicle, comprising:
a sealed tube assembly;
a blob of mercury contained within the tube assembly;
where the tube assembly includes a length of plastic tubing which is formed as a nominally straight cylindrical shape, and where the plastic material is such that the length of tubing is bendable;
where the tube assembly is bent to form a central curved portion and two arms that slope away, and upwards, from the central curved portion;
two pairs of electrical contacts, the pairs being disposed respectively one pair to each of the arms;
where the tube assembly is set so that the blob normally resides in the central curved portion, but the blob moves along one of the arms and bridges the contacts in that arm when the vehicle is subject to an excessive G-level.

2. Sensor as claimed in claim 1, wherein the plastic material is polyethylene.

3. Sensor as claimed in claim 2, wherein the tube assembly comprises a polyethylene tube of uniform section, and two polyethylene plugs inserted one in each end of the tube.

4. Sensor as claimed in claim 3 wherein the probes are wires pushed through the material of the walls of the tube.

5. Sensor as claimed in claim 4, wherein the wires are of stainless steel.

6. Sensor as claimed in claim 4, wherein the wires are soldered to electrical leads after having been pushed through the walls of the tube.

7. Sensor as claimed in claim 1, wherein the angle of the slope is 20 degrees to the horizontal.

8. Sensor as claimed in claim 3, wherein the tube is of 0.25 inches diameter bore and 0.06 inches wall thickness.

9. Sensor as claimed in claim 8, wherein the blob of mercury occupies a length in the tube of about 0.5 inches.

10. Sensor as claimed in claim 4, wherein the wire are disosed parallel to each other laterally across the tube, side-by-side along the length of the tube, and pass right through the tube.

11. Sensor as claimed in claim 10, wherein the wires are about 0.125 inches apart, and the wire nearest the plug is spaced about 0.125 inches from the plug.

12. Sensor as claimed in claim 11, wherein the wires are horizontal, and pass through the geometric centre of the tube.

13. Sensor as claimed in claim 1, wherein the plastic material is transparent.

14. Sensor as claimed in claim 1, wherein the two arms each are straight.

15. Sensor of claim 1, where the tube assembly is placed on a saddle having supports in contact with and underneath the tube, and having a strap which is in contact with, and on top of, the tube, and where the said bending of the tube is as a result of the strap being tightened so as to bend the tube between the supports and the strap.

16. Sensor for a driving habit monitor for a vehicle, comprising:
a sealed tube assembly of plastic material;
a pair of electrical contacts towards one end of the tube comprising electrically conductive probes inserted into the interior of the tube assembly; and
a blob of mercury contained within the tube assembly;
wherein the tube assembly is set at a slope so that the blob normally resides away from the contacts but the blob moves up the slope to bridge the contacts when the vehicle is subject to an excessive G-level;
wherein the tube assembly comprises a polyethylene tube of uniform section and two polythylene plugs inserted one in each end of the tube;
wherein the tube is of 0.25 inches diameter bore and 0.06 inches wall thickness;
wherein the tube assembly is bent to form a central curved portion and two arms that extend away from the central curved portion; wherein two pairs of contacts are provided, one pair in each arm;
wherein the two arms each are straight;
and wherein the tube assembly is placed on a saddle having supports in contact with and underneath the tube and spaced 0.75 inches apart, and having a strap which is in contact with and on top of the tube, the strap being tightened so as to bend the tube between supports and the strap.

17. Sensor as claimed in claim 16, wherein the length of the tube, between the plugs, is 2 inches.

18. Sensor as claimed in claim 17, wherein the probes are wires pushed through the material of the walls of the tube;
   wherein the wires are disposed parallel to each other laterally across the tube, side-by-side along the length of the tube, and pass right through the tube;
   wherein the wires are about 0.125 inches apart, and the wire nearest the plug is spaced about 0.125 inches from the plug;
   and wherein the wires are horizontal, and pass through the geometric centre of the tube.

19. Driving habit monitor for a vehicle, comprising two sensors as claimed in claim 18, the first sensor being disposed along the direction of travel of the vehicle to indicate excesses of G-level due to accelerating or decelerating, and the other being disposed at right angles to the first to indicate excesses of G-level due to cornering.

20. Monitor as claimed in claim 19, wherein the two arms of both sensors, are all four disposed at 20 degrees to the horizontal.

* * * * *